United States Patent
Macy et al.

(10) Patent No.: US 6,823,455 B1
(45) Date of Patent: Nov. 23, 2004

(54) METHOD FOR ROBUST WATERMARKING OF CONTENT

(75) Inventors: William W. Macy, Palo Alto, CA (US); Matthew J. Holliman, Libertyville, IL (US); Minerva Ming-Yee Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/288,836

(22) Filed: Apr. 8, 1999

(51) Int. Cl.[7] .............................. H04L 9/00; H04K 1/00; G09C 3/00; G09C 5/00
(52) U.S. Cl. .............................. 713/176; 380/38; 380/54
(58) Field of Search ......................... 713/176; 380/54, 380/28

(56) References Cited

U.S. PATENT DOCUMENTS

| | | | | |
|---|---|---|---|---|
| 5,768,426 A | * | 6/1998 | Rhoads | 382/232 |
| 5,905,800 A | * | 5/1999 | Moskowitz et al. | 380/28 |
| 5,949,885 A | * | 9/1999 | Leighton | 380/54 |
| 5,960,081 A | * | 9/1999 | Vynne et al. | 713/176 |
| 6,272,634 B1 | * | 8/2001 | Tewfik et al. | 713/176 |

* cited by examiner

Primary Examiner—Gilberto Barrón
Assistant Examiner—Benjamin E. Lanier
(74) Attorney, Agent, or Firm—Blakely, Sokoloff, Taylor & Zafman LLP

(57) ABSTRACT

One inventive aspect pertains to a watermarking mechanism that allows a watermark to be determined from only a part of the video sequence without human intervention and without reference to the original watermarked frames. This watermark has improved invisibility, detection reliability and robustness. Invisibility is improved through the inclusion of frame difference parameters to calculate the amplitude of the watermark. Detection reliability and robustness can be improved by assuring that opposite signed values for the pseudo-random number sequence are spatially near each other and using data blocks forming the data sets, respectively. Another inventive aspect pertains to a watermarking mechanism that is exclusively dependent on the data contained in the data sets and is completely interoperable between spatial and compressed domains.

2 Claims, 9 Drawing Sheets

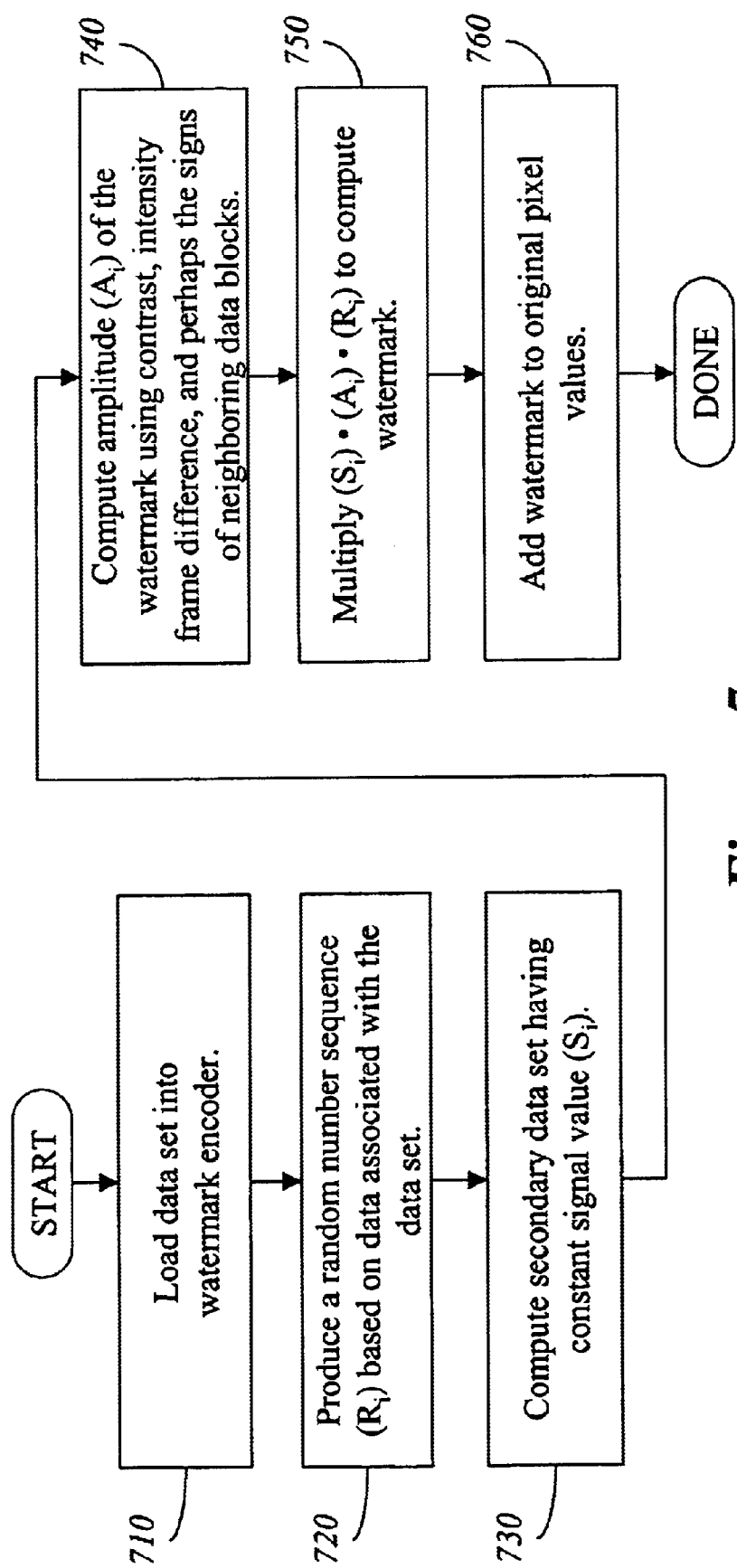

METHOD FOR ROBUST WATERMARKING OF CONTENT

BACKGROUND

1. Field

The present invention relates to the field of digital watermarking.

2. General Background

Each day, consumers receive information from content providers in a variety of forms such as movies or television programming. When transmitted in a standard analog format, the information is somewhat protected due to its inherent analog nature. For example, a recorded movie normally has poorer image quality than the original analog version.

Over the last few years, there has been a growing demand for digital content. In general, "digital content" is data that is perceived during display or playback (e.g., a still image, video, text, audio, programs, etc.). Unlike analog, digital content can be easily copied or manipulated without affecting its perceived quality. This "quality" may be measured through visual clarity during display, audible clarity during audio playback, accuracy of characters in text or code as well as other factors. Since digital content can be easily manipulated, content providers have been hesitant in providing premier digital content due to the absence of any mechanism to protect the content against illegal copying and/or distribution.

Recently, digital watermarking has emerged as a technique to protect against unauthorized copying and distribution of digital content. More specifically, "digital watermarking" comprises an act of inserting information (referred to as a "watermark") into content either in a spatial domain or in a compressed domain. The insertion of a watermark may be performed in an unobtrusive way so that the quality of the content is not reduced. For example, an invisible watermark is inserted into content in the spatial domain by adding or subtracting small numbers from pixel values. When watermarks are inserted into content in the compressed domain, however, values are added or subtracted from transform coefficients.

Digital watermarking further comprises the act of detecting and subsequently extracting a watermark from content, even if the content is altered with significant degradation. Conventional detection methods use a spread spectrum approach as set forth in equation (2). As denoted, "$B_j$" is a signal with values of $-1$ or $1$, where "j" refers to a particular signal bit, "$S_i$" as a spread sequence of signal bit $B_j$ where "i" refers to a number (N) of pixels or blocks of pixels used to encode bit $B_j$. "$A_i$" is an amplitude factor, and $R_i$ is a pseudo-random number modulation sequence with a series of values being "$-1$" or "$1$". The addition of watermark ($W_i$) changes the intensity of an image from its normal intensity ($I_i$) to its watermarked intensity ($I_i'$) as set forth in equation (1):

$$I_i + W_i = I_i' = S_i A_i R_i \qquad (1)$$

Thus, as set forth in equation (2), $B_j$ can be detected by multiplying the watermarked pixels $I_i'$ by $R_i$.

$$B_j = \text{sign}\left(\sum_{i=1}^{N} I_i' R_i\right) = \text{sign}\left(\sum_{i=1}^{N} I_i R_i + \sum_{i=1}^{N} S_i A_i R_i^2\right) \qquad (2)$$

Thus, the value of the first term $$\sum_{i=1}^{N} I_i R_i$$

should approach zero when "N" (the number of encoded pixels) is large so that the sign of $B_j$ is equal to the sign of the second term $$\sum_{i=1}^{N} S_i A_i R_i^2.$$

Since, in practice, $$\sum_{i=1}^{N} I_i R_i$$

is not truly zero, $B_j$ is calculated as follows:

$$B_j = \text{sign}\left(\sum_{i=1}^{N} I_i' R_i - \text{mean}(I_i') \times \sum_{i=1}^{N} R_i\right) \qquad (3)$$

These conventional watermarking functions have the desired features of efficient detection, no requirement of original material for detection and little impact on compressibility. However, they do not address invisibility, high detection reliability and robustness. For example, a watermark can be kept invisible by determining an appropriate amplitude factor value. As set forth on pages 92–99 of a 1997 reference by Ingemar J. Cox and Matt L. Miller entitled "A Review of Watermarks and the Importance of Perceptual Modeling," SPIE vol. 3016, one technique for determining the amplitude factor value is based on properties of the image such as its contrast and brightness. However, this technique does not account for watermarks that are invisible in still images but produce artifacts in video.

The conventional watermarking functions have an inherent weakness in that detection reliability is limited where the term $$\sum_{i=1}^{N} I_i R_i$$

dominates the term $$\sum_{i=1}^{N} S_i A_i R_i^2.$$

Normally, each individual $I_i R_i$ product is about a factor of 100 larger than each $S_i A_i R_i^2$ product. Thus, if N is not sufficiently large so that the $I_i R_i$ product approaches zero, a substantial percentage of the sign detection for $B_j$ will be incorrect. While proposals have been made to increase N to improve detection reliability, this would drastically increase the number of frames required for reliable detection.

It is now appreciated that conventional watermarking techniques do not fully address invisibility and security considerations. For example, a watermark invisible in a still image may produce visible artifacts in a video sequence when the sign of the watermark changes between adjacent frames. Also, watermarks produced from the same key may be detected when inserted into successive frames of the video sequence by averaging images found in successive frames.

Hence, it would be desirable to develop digital watermarking mechanisms supporting improved detection reliability through frame differences or image-dependent watermark generation.

SUMMARY OF THE INVENTION

Briefly, one embodiment of the invention relates to a method for improving detection of a watermark. The method comprises generating a pseudo-random sequence of numbers based on data associated with the data set, producing a watermark based on the pseudo-random number sequence, and embedding the watermark into the data set.

BRIEF DESCRIPTION OF THE DRAWINGS

The features and advantages of the present invention will become apparent from the following detailed description of the present invention in which:

FIG. 7 is a diagram of an illustrative flowchart of an embodiment of the operations of a watermark encoder operating in a spatial domain and employed in a first platform of the content distribution system of FIG. 1.

FIG. 8 is a block diagram of a frame being embedded with the watermark.

DETAILED DESCRIPTION OF AN EMBODIMENT

Herein, embodiments of the invention are set forth to describe a platform and corresponding method to produce and embed a digital watermark having enhanced invisibility, detection reliability and/or robustness. It should be apparent that certain embodiments are described in order to provide a thorough understanding of the invention; however, these embodiments should be construed as illustrative in nature, not restrictive.

In the following description, certain terminology is used to describe characteristics of the present invention as well as cryptographic functionality. For example, a "platform" comprises an electronic device including a processor (e.g., a microprocessor, a microcontroller, a state machine, etc.) and a communication device to transmit and/or receive content. Examples of a platform include, but are not limited or restricted to a computer (e.g., a laptop, desktop, hand-held, mainframe, etc.), communication equipment (e.g., telephone, telephone with video display, etc.), or a set-top box (e.g., cable box, network computer, etc.). "Content" is generally defined as (i) data in the form of video, images, audio, text, programs or any combination thereof, and/or (ii) control information such as Internet Protocol (IP) commands, identifiers and the like. A "data set" includes a predetermined amount of perceivable content (e.g., one or more frames of video, a still image, etc.). A "sequence" comprises one or more successive data sets.

Additionally, a "communication link" is defined as one or more mediums to transfer content from one location to another. Examples of a communication link include, but are not limited or restricted to electrical wire, fiber optic, cable, wireless channel(s) established using infrared (IR) or radio frequency (RF) signaling, a private local area network, a wide area network or even the Internet. A "mechanism" includes a particular functionality performed through execution of software and/or operation of hardware.

With respect to cryptographic functionality, a "key" is information used by a cryptographic function (e.g., a symmetric cryptography) for encryption, decryption and/or generation of a random or pseudo-random number. Herein, each key is sized to be 160-bits in length, although any bit size may be used. A "one-way hash function" converts content from a variable-length into a fixed-length with no ability to recover the variable-length content. Examples of a one-way hash function include a Secure Hash Algorithm (SHA-1) as specified a 1995 publication entitled *Secure Hash Standard FIPS* 180-1 (Apr. 17, 1995). The term "secure" (and any other tense or form thereof) indicates a state where it is virtually computationally infeasible for an unauthorized individual to gain access to content or other data in a plain text format.

Figure 1:
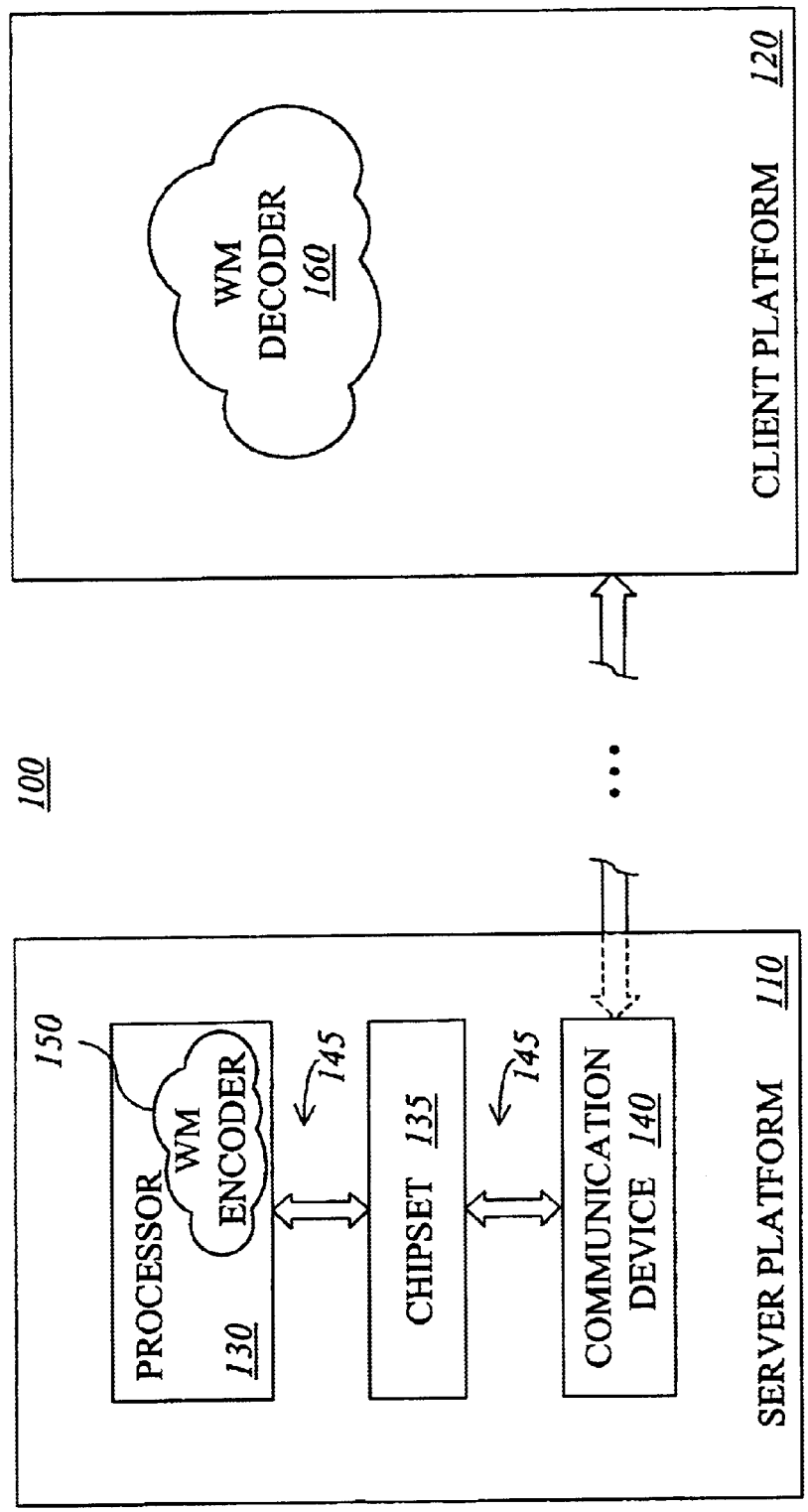
FIG. 1 is a diagram of an illustrative embodiment of a content distribution system.

Referring to FIG. 1, an illustrative block diagram of an embodiment of a content distribution system 100 is shown. In this embodiment, content distribution system 100 comprises a server platform 110 and a client platform 120. Server platform 110 comprises a processor 130, a chipset 135, and a communication device 140 (e.g., a modem card, network interface card, etc.) coupled together through buses 145. Server platform 110 further comprises a watermark encoder 150. While this embodiment illustrates a dual platform system, it is contemplated that both watermark encoding and decoding may occur in the same platform.

More specifically, watermark encoder 150 comprises code executed by processor 130 to digitally watermark one or more data sets. Of course, there exist many other embodiments of a watermark encoder which, although slightly different in design, do not deviate from the spirit and scope of the invention. For example, watermark encoder 150 may be (1) implemented as code operated on by chipset 135, (2) integrated into logic (e.g., within processor 130 or chipset 135), or (3) implemented as code or hardware within a peripheral coupled to server platform 110.

Figure 2:
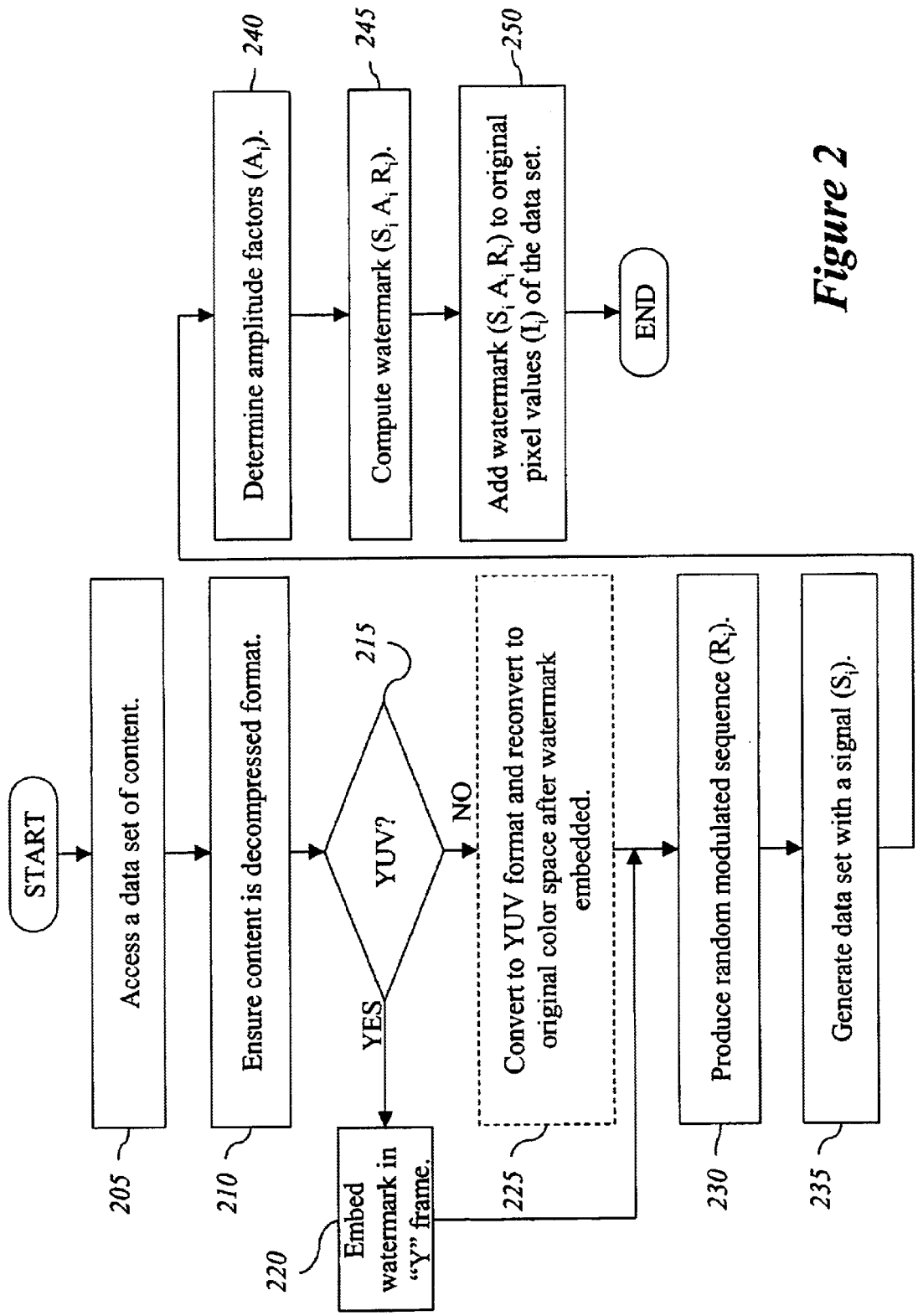
FIG. 2 is a diagram of an illustrative embodiment of the operations of a watermark encoder operating in a spatial domain and employed in a first platform of the content distribution system of FIG. 1.

Referring now to FIG. 2, a diagram of an illustrative embodiment of the operations of watermark encoder 150, operating in a spatial domain and employed in server platform 110 of content distribution system 100 of FIG. 1, is shown. Initially, the watermark encoder accesses a data set of content (205). To embed a watermark, the content must be in a decompressed format (210). Decompression may involve multiple stages. For example, to decompress Motion Picture Experts Group (MPEG) based video, both Huffman decompression and Discrete Cosine Transform (DCT) decompression is used. In the event that content is maintained in a YUV color format, the watermark normally is embedded in the Y frame (215 and 220). If content is not in a YUV color format, it is contemplated that the content may be converted to a YUV color format, embedded with a watermark in the Y frame, and converted back to its original format (225). This conversion is optional.

Figure 3:
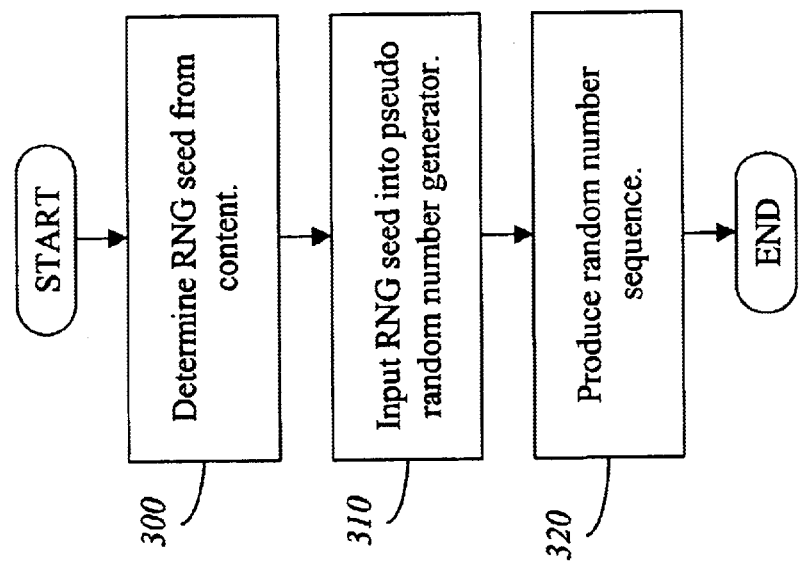
FIG. 3 is a diagram of a first illustrative embodiment of the operations undertaken to produce a pseudo-random number sequence to compute a watermark.

To compute the watermark, a pseudo-random number sequence is generated (230). As shown in FIG. 3, in one embodiment, this is accomplished by first determining a random number generator (RNG) seed from the content (300). In general, the "RNG seed" is a combination of a bit sequence derived from the content and/or a key held in confidence for use by both the server and/or client platform (s). For example, the RNG seed may be produced from the bit sequence being exclusively OR'ed (XOR'ed) with the key. If greater security is desired, an alternative embodiment for generation of the RNG seed includes the concatenation of the bit sequence and the key to produce an intermediary bit result. This bit result undergoes a hash function to produce a hash value that acts as the RNG seed. This RNG seed is input into a pseudo-random number generator that subsequently produces a pseudo-random number sequence (310 and 320).

Figure 4:
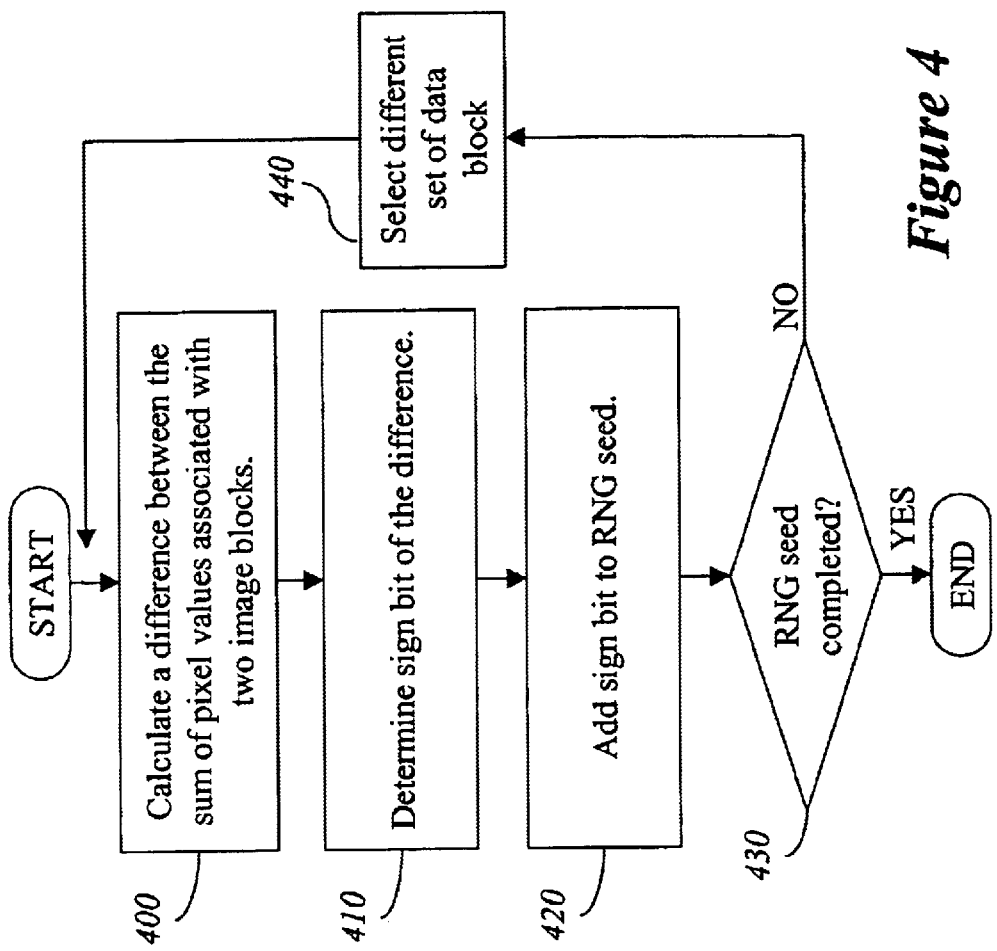
FIG. 4 is a diagram of a second illustrative embodiment of the operations undertaken to produce a pseudo-random number sequence to compute a watermark.

As shown in FIG. 4, in another alternative embodiment, the RNG seed may be computed by taking a difference of sums of pixel values associated with various image blocks of a data set (400). A bit of the RNG seed is determined from the sign of the differences between the pixel sums and concatenated with the RNG seed (410 and 420). This process is continued until the entire RNG seed is computed (430 and 440). It is contemplated that the pairing of blocks used to compute the difference should be located far from each other to maximize that difference.

Referring back to FIG. 2, a data set generally equivalent to the size of the content is generated having a signal denoted by "$S_i$" (235). Used as a template for producing the watermarked data set, this data set is a collection of data blocks each corresponding to a particular grouping of pixels. Data blocks are used for improving the robustness of the watermark. Each element of the data block has a value of either "1" or "−1", corresponding to the bits to be embedded in the content.

In addition, a data block with amplitude factors ($A_i$) is determined in order to compute the watermark (240). Unlike conventional calculations, the amplitude factor for the present invention is based on contrast, intensity, frame difference and position in a cycle over which the amplitude factor is increased. The weighting of these parameters to produce $A_i$ is a design choice. For illustration, the amplitude factor is constant throughout the data block and repeated for the entire data set. Also, the amplitude factor can be based on surrounding signs of watermark elements. For example, if the neighboring watermarked data blocks are all positive, a negative watermarked data block might need to be attenuated slightly around the edges to avoid artifacts, especially when watermarking larger block sizes where smooth watermark patterns are essential for invisibility.

Figure 5:
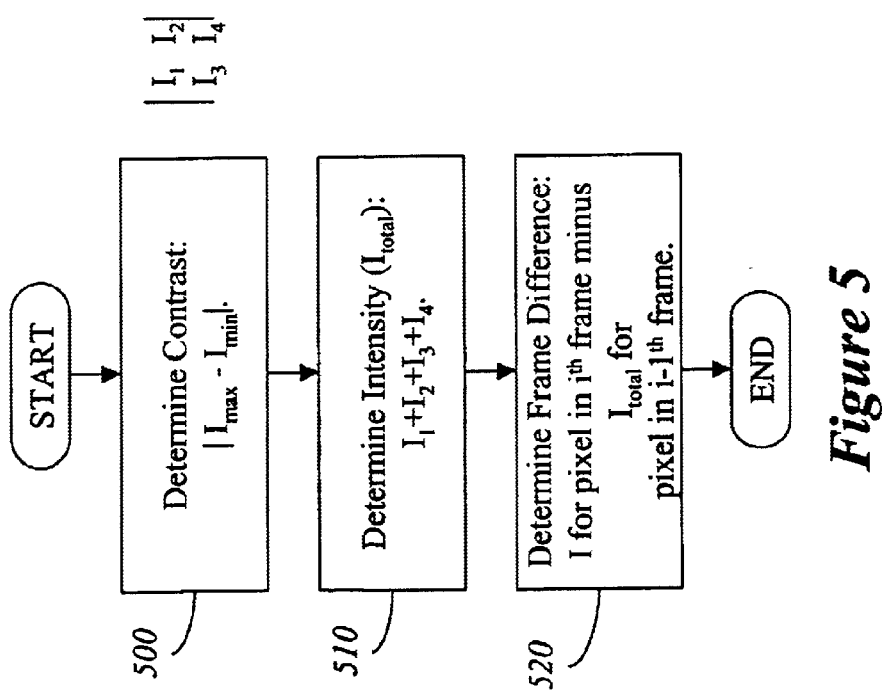
FIG. 5 is a diagram of an illustrative embodiment of the operations undertaken to produce an amplitude factor used to compute the watermark.

Herein, for this embodiment, contrast is measured by the absolute difference between a minimum and maximum pixel value for a data block such as a 2×2 data block as shown for ease in calculation. As shown in FIG. 5, the contrast is equal to $|I_{max}-I_{min}|$, where $I_{max}$ is the maximum pixel value for $I_1$, $I_2$, $I_3$ and $I_4$ while "$I_{min}$" is the minimum pixel value for that grouping (500). The intensity is the sum total of the pixel values in the data block. As shown in FIG. 5, the intensity is equal to $I_1+I_2+I_3+I_4$ (510). Frame difference is measured by a difference between the intensity measured for a pixel ($I_i$, "i" being any chosen value 1 to N) in a current frame and the intensity measured for a corresponding pixel ($I_{i-1}$) in a corresponding position for a previous frame (520). By computing the frame difference, it allows video artifacts caused by sign changes associated with the watermarked data to be eliminated.

Thereafter, a data set with the pseudo-random number sequence ($R_i$) of the watermark is generated. The seed and the signal frame are already produced. In order to reduce the magnitude of the first term $$\left(\sum_{i=1}^{N} I_i R_i\right)$$

and improve detection reliability, a specified fraction of blocks adjacent to a data block whose value of $R_i$ has been determined might be given the opposite sign. The decision whether to assign a data block a sign based on the sign of an adjacent block or to generate a random sign can be determined by the random number generator.

Thereafter, referring back to FIG. 2, a watermark is computed by combining $S_i$, $A_i$ and $R_i$ (245) (also referred to as the "message text"). This combination scheme may be calculated through multiplication, although other arithmetic operations may be used. The message text ($S_i A_i R_i$) is added to the original pixel values ($I_i$) of the data set to compute the watermarked image (250). In particular, an extractable watermark is randomly or pseudo randomly inserted where this pattern for insertion is known or capable of being computed by an authorized watermark decoder. Such insertion may be performed by tiling data blocks featuring the watermark into the signal frame, or by otherwise arranging the watermarked data blocks over the image in any manner whatsoever. For example, the watermark key may be used to pseudo-randomly select image locations to watermark.

Figure 6:
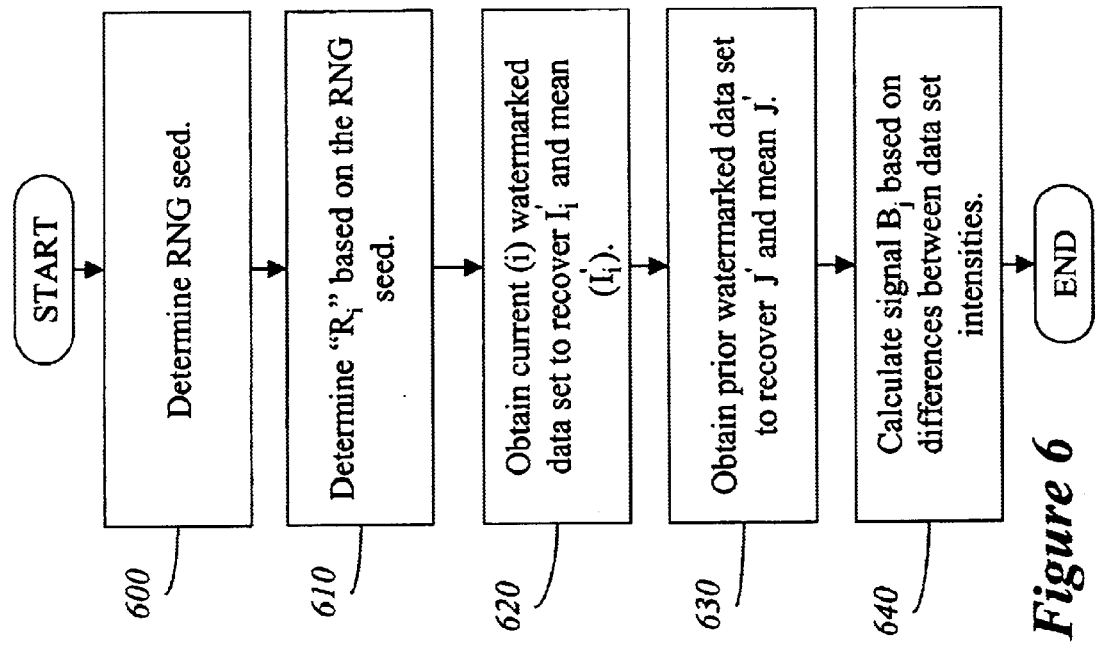
FIG. 6 is a diagram of an illustrative embodiment of the operations of a watermark decoder operating in a spatial domain and employed in a second platform of the content distribution system of FIG. 1.

Referring now to FIG. 6, a diagram of an illustrative embodiment of the operations of a watermark decoder 160, operating in a spatial domain and employed in client platform 120 of content distribution system 100 of FIG. 1, is shown. Herein, the watermark decoder is code and/or hardware executed by a processor, chipset or a peripheral coupled to server platform 110.

Initially, the watermark decoder determines the RNG seed (600). From the RNG seed, the pseudo-random modulation sequence ($R_i$) can be generated as described above (610). Also, the watermark decoder obtains the current watermarked frame (I') and a previous watermarked frame referred to as J', corresponding to some $k^{th}$ previous frame (where $k \geq 1$) (620 and 630). From this information, in 640, a signal bit value ($B_j$) can be recovered from the following equation, where the second product is optional and may be omitted for simplicity:

$$B_j \left[ \text{sign} \left( \sum_{i \in D} I'_i - J'_i \right) R_i - \text{mean}(I'_i - J'_i) \sum_{i \in D} R_i \right]$$

This process is repeated until the watermark is recovered (650). In the simplest case, the set D from which pixels are chosen is simply the set of pixel locations corresponding to the embedded information bit $B_j$. More reliable detection can be obtained by thresholding the frame differences, so that only frame differences falling below some detection threshold are used for watermark detection. Additionally, motion-compensated frame differences may be used, so that elements in I' are mapped to motion-compensated elements in J'. This can be achieved efficiently by means of the motion vector information often present in compressed bit streams, e.g. MPEG.

In another variation of watermark encoding and decoding, the watermark message $S_i A_i R_i$ may be added directly into transform domain coefficients, such as the DCT coefficients present in a Joint Picture Experts Group (JPEG) or MPEG compressed bit stream. One possibility is to transform a watermark block into the same domain as the target data. This is accomplished by taking the discrete cosine transform of the watermark data, and then adding the transformed data to the transformed original data already present in the bit stream. Detection can subsequently proceed in the spatial domain as outlined above.

Another possibility is to add the watermark message $S_i A_i R_i$ directly to the transform domain coefficients, and later detect directly from those same coefficients. For example, an amplitude factor $A_i$ could be determined directly for a given quantized DCT coefficient $C_i$ based on that particular block's activity and the energy of the original coefficient $C_i$, and the watermarked coefficient value could then be computed as $C_i' = C_i + S_i A_i R_i$. In this case, $A_i$ would generally take on integer values in the range $[-1, 1]$ when manipulating quantized data, although other configurations are possible. Watermark detection then takes the form of Equation 2 as described previously, applied directly to the DCT coefficients $C_i'$. As a result of the properties of the discrete cosine transform, this encoding/detection mechanism permits high bit rate data embedding with good detection reliability, and with direct implementation possible on the compressed bit stream.

Referring now to FIG. 7, in accordance with another inventive aspect, a diagram of an illustrative embodiment of the operations of watermark encoder 150 of FIG. 1, operating in a spatial domain and employed in server platform 110 of content distribution system 100 of FIG. 1, is shown. Initially, a data set of a sequence is loaded into the watermark encoder (710). For clarity sake, herein, the data set is considered to be a frame of a video sequence as shown in FIG. 8. Frame 800 includes a plurality of data blocks 810$_1$–810$_N$, where "N" varies depending on the selected size of data blocks 810$_1$–810$_N$ (e.g., 8×8, 4×4 having a larger N value or another grouping of elements). However, it is contemplated that the data set may comprise other types of data, as described above, without departing from the spirit and scope of the invention.

Figure 9:
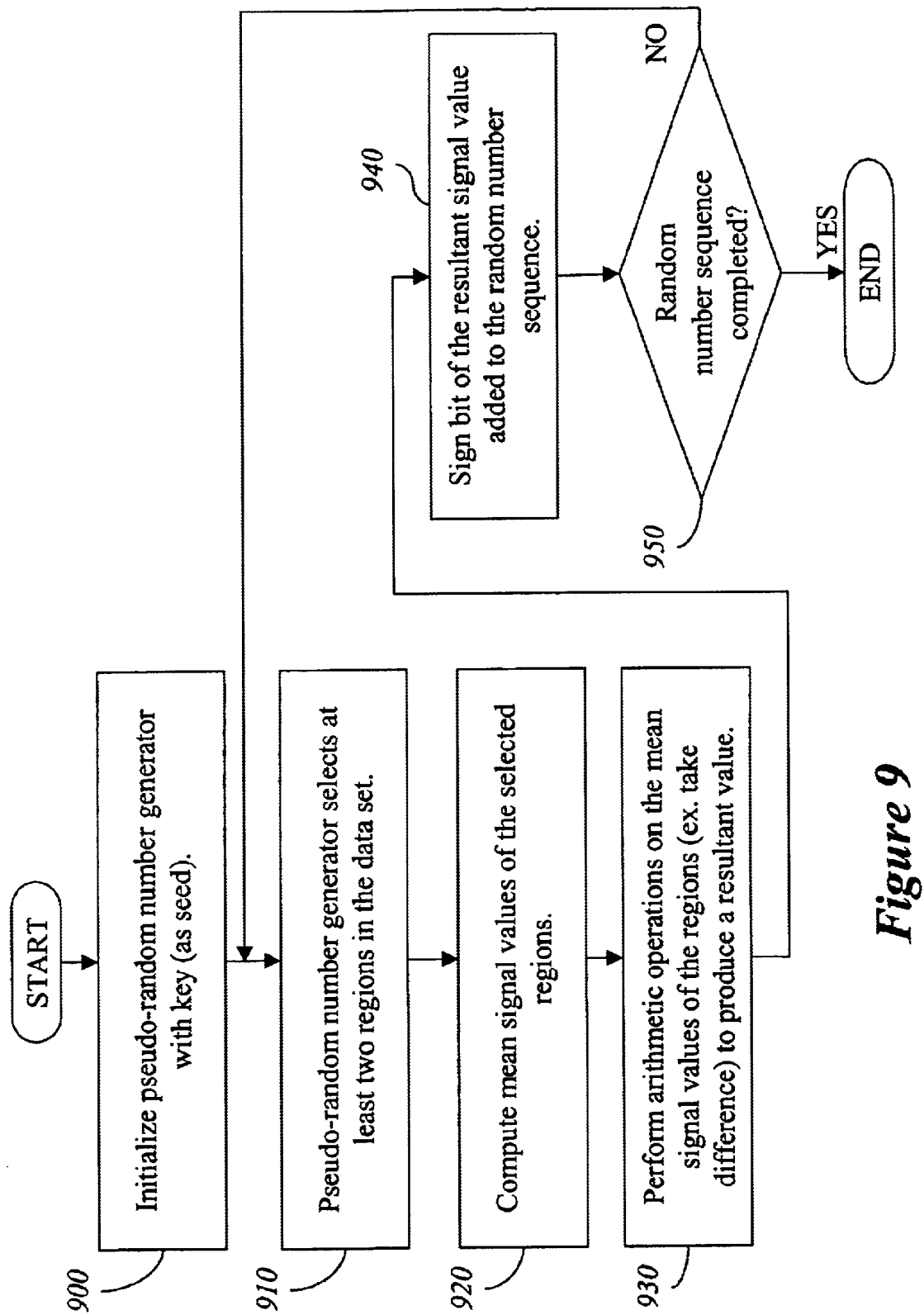
FIG. 9 is a flowchart of an illustrative embodiment of the operations of the watermark encoded to reduce a pseudo-random sequence used to produce the watermark.

Referring back to FIG. 7, to compute the watermark, a pseudo-random number sequence ($R_i$) is produced. Each number of the pseudo-random sequence is based on the user's key and an image block of the frame (720). The key determines what bit sequence is extracted from the given image block. As shown in FIG. 9, in one embodiment, the starting point for generating the pseudo-random number sequence is determined by initializing a pseudo-random number generator, being software or hardware of the server platform, with a seed value (900). Herein, the "seed value" includes a key normally held in confidence and in the form of a secret symmetric key or a private key of a public/private key pair. The key may be provided to and stored in the server platform in a secure manner, usually during initialization of the content distribution system.

Thereafter, for each image block of the frame (data set), two or more selected regions in the frame are selected by the pseudo-random number generator (910) upon receipt of the key. A first region includes one or more image blocks that collectively represent X pixels of the frame, where the value of "X" is defined by the application. For example, 16×16 blocks of image data may be used for this purpose, in which case X=256. A second region includes one or more image blocks that collectively represent Y pixels of the frame, where the value of "Y" is defined by the application. A "mean signal value" of each region is computed by summing the intensities of each of the X or Y pixels forming the selected regions and dividing by X or Y, respectively (920). Herein, the mean signal value of the first selected region $$\sum_{i=1}^{X} \frac{I_i}{X}$$

is subtracted from at least the mean signal value of the second selected region $$\sum_{i=1}^{Y} \frac{I_i}{Y}$$

to produce a resultant value (930). Thus, a sign of the resultant value is used as a number of the pseudo-random sequence $R_i$ (940). This process is repeated using different combinations of regions until the pseudo-random sequence is completed, namely, the size of the sequence corresponds to the number of image blocks being watermarked (950).

It is contemplated that other arithmetic operations, besides subtraction, may be performed on the mean signal values of the first and second regions to produce the resultant value. For example, addition, multiplication, division or any combination thereof may be performed in lieu of or along with a subtraction operation. Also, arithmetic operations may be performed on more than two regions in order to produce the resultant value. From that, the sign of the resultant value is used as a number for the pseudo-random sequence $R_i$.

Once the pseudo-random number sequence is determined, the message text ($S_i A_i R_i$) to be embedded is added to the corresponding image data in a manner set forth in FIG. 2. Thus, the watermarked frame is created.

In particular, referring back to FIG. 7, after the pseudo-random sequence is, determined, a secondary frame generally equivalent to the size of the original frame is generated. The secondary frame features a signal denoted by "Si" (730). This frame is a collection of data blocks each corresponding to a particular grouping of pixels representing values of "1" or "−1".

In addition, a data block with amplitude factors ($A_i$) is determined in order to compute the watermark (740). Unlike conventional calculations, as described above, the amplitude factor may be based on contrast, intensity, frame difference, position in a, cycle over which the amplitude factor is increased, and surrounding signs of the watermark elements.

Thereafter, a watermark is computed by combining $S_i$, $A_i$ and $R_i$ (750). This combination scheme may be calculated through multiplication of these computed values. The watermark ($S_i A_i R_i$) is added to the original pixel values ($I_i$) of the frame to compute the watermarked image (760). In particular, an extractable watermark is inserted into the frame where the pattern for insertion is known or capable of being computed by an authorized watermark decoder. Such insertion may be placed randomly or pseudo randomly into data blocks of the frame.

Figure 10:
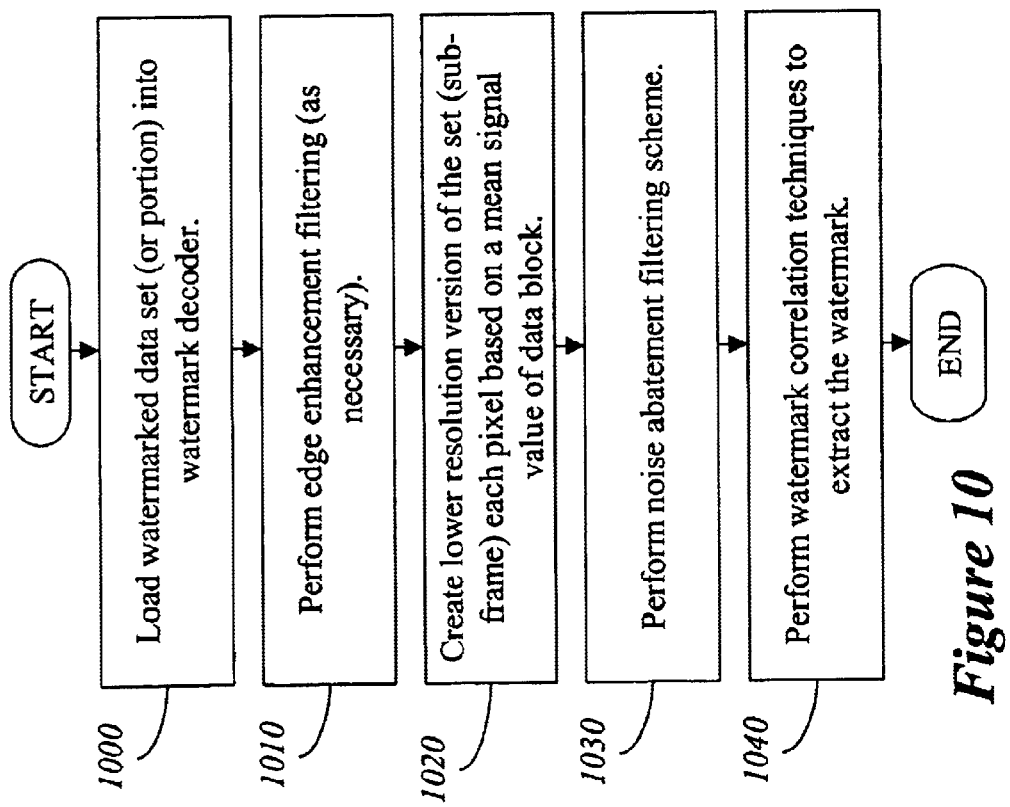
FIG. 10 is a diagram of an illustrative embodiment of the operations of a watermark decoder operating in a spatial domain and employed in a second platform of the content distribution system of FIG. 1.

Referring now to FIG. 10, a diagram of an illustrative embodiment of the operations of a watermark decoder 160, operating in a spatial domain and employed in client platform 120 of content distribution system 100 of FIG. 1, is shown. Initially, the watermarked frame (or portion thereof) is loaded into the watermark decoder (1000). For noise extraction, a pseudo-random number generator is initialized with the key. Once the watermarked frame is loaded into the watermark decoder, it undergoes optional single or iterative filtering operation(s) (1010). Normally, the filtering operation includes an edge enhancement filtering mechanism acting as a high-pass filter mechanism; namely, each watermarked region of the watermarked frame is multiplied by a filter matrix to enhance the edges of the image. This is done to highlight differences in watermarked data blocks to increase watermark detection reliability.

Thereafter, a lower resolution version of the frame is created (1020). Each pixel of the lower resolution sub-frame is based on a mean signal value of the corresponding watermarked data block in the original watermarked frame. For example, for a 704×480 frame having 8×8 data blocks, the lower resolution sub-frame constitutes a 88×60 sub-frame. Thereafter, watermark detection is performed on the lower resolution sub-frame, where each random bit for each pixel is computed from the original watermarked frame in a manner identical to the sign calculations for differences between mean signal values of selected regions as described above (1040). As an option, the sub-frame may undergo a filtering scheme to partially remove noise contributed by the original image in order to further enhance detection reliability of the watermark. This noise abatement filtering scheme involves subtraction of a computed local mean signal value of pixels within the frame (1030). Watermark detection extraction occurs in accordance with the following:

$$B_j = \text{sign}\left(\sum_{i=1}^{N} I_i(\text{filtered}) \cdot R_i\right)$$

Figure 11:
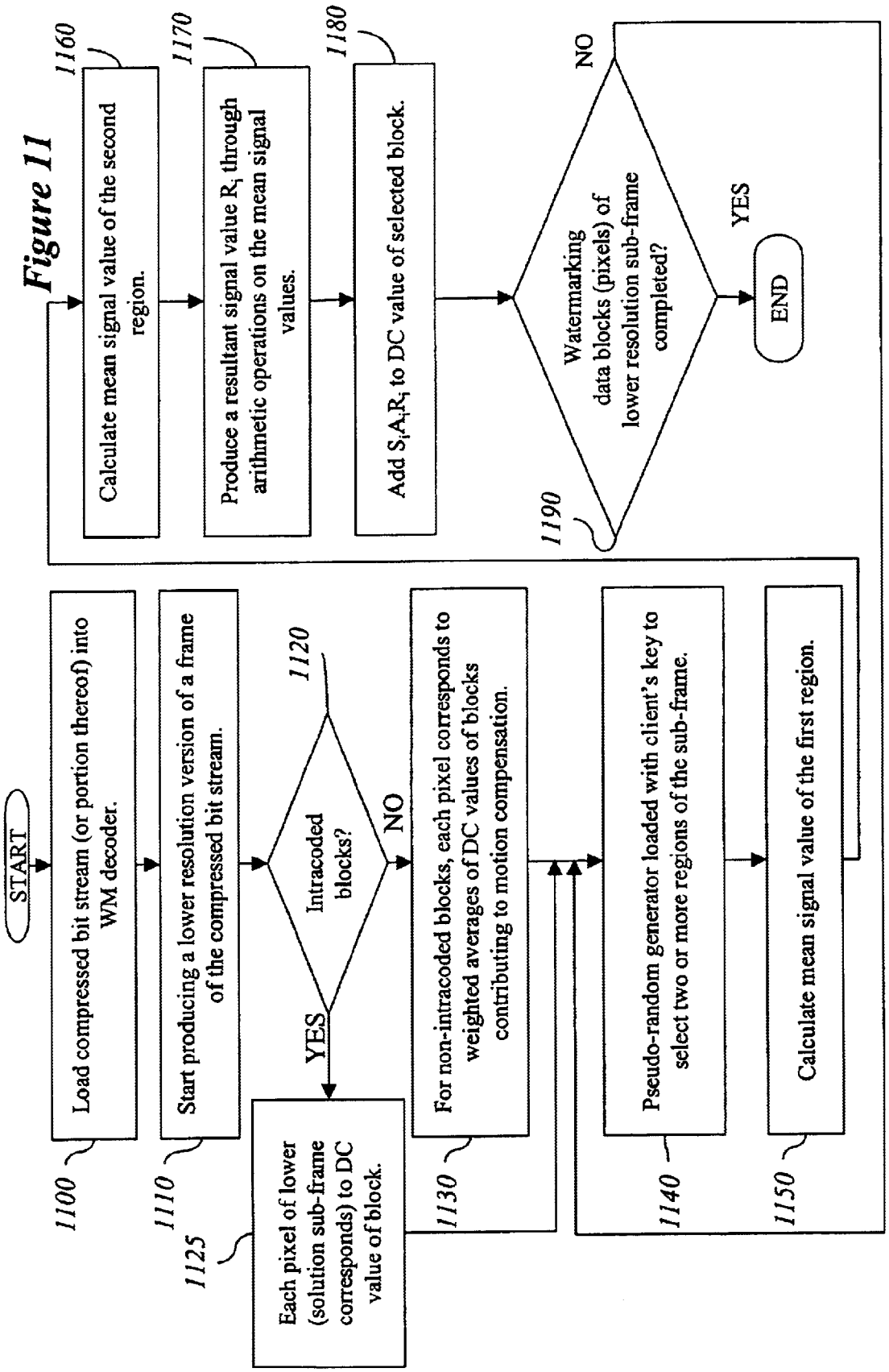
FIG. 11 is a diagram of an illustrative embodiment of the operations of watermark encoder operating in a compressed domain and employed in server platform of content distribution system of FIG. 1.

Referring now to FIG. 11, a diagram of an illustrative embodiment of the operations of watermark encoder 150 of FIG. 1, operating in a compressed domain and employed in server platform 110 of content distribution system 100 of FIG. 1, is shown. Initially, a compressed bit stream (e.g., MPEG video) is loaded into the watermark encoder (1100). To watermark 8×8 data blocks arranged on 8-pixel boundaries of a frame, Direct Current (DC) value of each block are adjusted in an identical manner described for the spatial domain. However, for a frame consisting of 4×4 data blocks or data blocks not falling on 8-pixel boundaries, adjustment of Alternating Current (AC) coefficients associated with the frame may also be necessary.

Assuming watermarking a frame having 8×8 data blocks, a lower resolution version of a frame associated with an incoming bit stream is created (1110). The selected resolution is based on the size of the data blocks associated with the frame to be watermarked. For example, for 8×8 data blocks, the lower resolution frame comprises a 88×60 sub-frame when the original frame is 704×480. For intracoded data blocks (coded with respect to the current frame), each pixel of the lower resolution sub-frame corresponds to the DC value of a corresponding luminance data block of the original frame (1120 and 1125). For non-intracoded blocks (coded with respect to one or more predictor frames), each pixel of the lower resolution frame corresponds to a motion-compensated Discrete Cosine Transform (DCT) block, and is derived by computing the weighted averages of the DC values of blocks contributing to the motion compensation, where each block's weight is directly proportional to its percentage of coverage of the DCT block (1130).

Thereafter, a pseudo-random number generator is loaded with the key to select two or more selected regions of the frame (1140). Of course, each of these regions are scaled in size and location to compensate for the lower resolution. Similar to the calculations in the spatial domain, a first region includes one or more data blocks that collectively represent U pixels, where the value of "U" is defined by the application. A second region includes one or more data blocks that collectively represent V pixels, where the value of "V" is defined by the application. A "mean signal value" of each region is calculated by summing the intensities of each of the U or V pixels forming the selected regions and dividing the intensity sum by U or V, respectively (1150 and 1160). The mean signal value of the first selected region is subtracted from at least the mean signal value of the second selected region to produce a resultant value (1170). Thus, a sign of the resultant value is used as R and is used to modulate $A_i S_i$ in the same fashion as the watermark encoder described in FIG. 2, after which the quantity $R_i A_i S_i$ is added to the DC value of a selected data block (1180). This process is repeated using different combinations of regions until all or perhaps some of the data blocks have been watermarked (1190).

Figure 12:
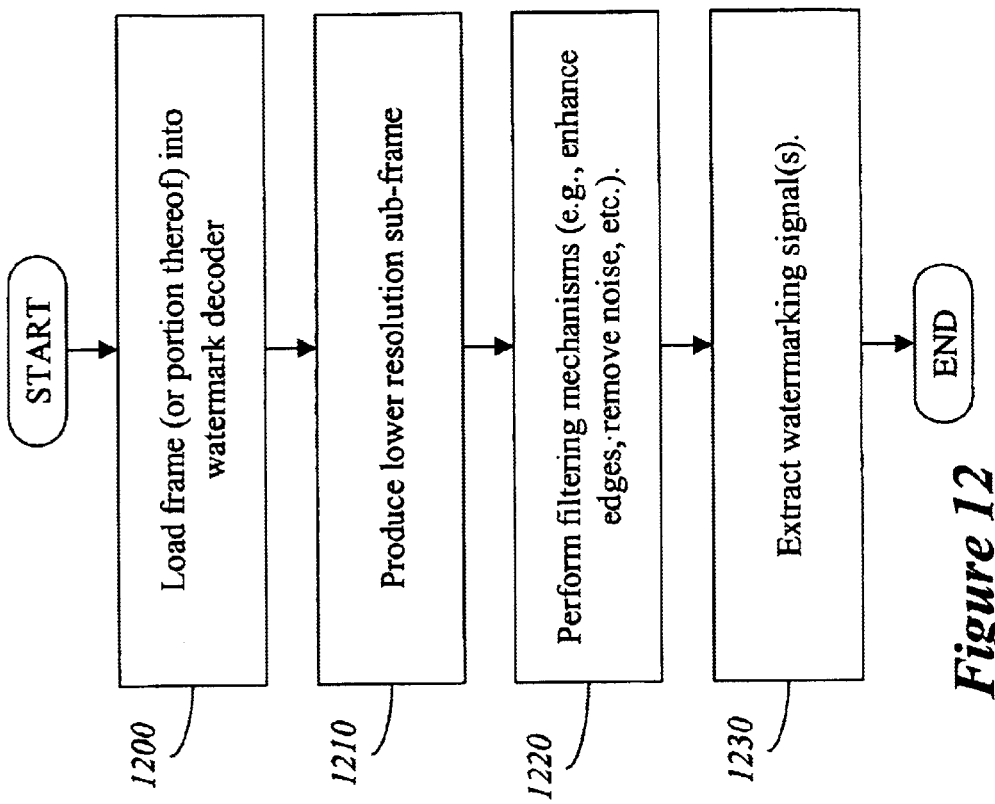
FIG. 12 is a diagram of an illustrative embodiment of the operations of a watermark decoder operating in a compressed domain and employed in client platform of content distribution system of FIG. 1.

Referring now to FIG. 12, a diagram of an illustrative embodiment of the operations of a watermark decoder 160, operating in a compressed domain and employed in client platform 120 of content distribution system 100 of FIG. 1, is shown. Initially, a portion or an entire frame of a video sequence is loaded into the watermark decoder (1200). From the watermarked frame, the lower resolution sub-frame is produced where each pixel of the watermarked sub-image is based on a mean signal value of a corresponding watermarked data block (1210). The sub-frame can be constructed in an identical manner to that of the compressed domain encoder configuration. Thereafter, watermark detection is performed on the sub-frame by undergoing an edge enhancement filtering mechanism (1220). This enhances the differences between watermarked data blocks to assist in watermark detection reliability. In addition, the sub-frame may undergo local mean filtering to partially remove noise from the signal. Thereafter, the watermarking signal may be extracted as follows (1230):

$$B_j = \text{sign}\left(\sum_{i=1}^{N} I_i(\text{filtered}) \cdot R_i\right)$$

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for extracting a watermark from a video sequence comprising:
    computing a pseudo-random number sequence using the random number generator seed;
    receiving the video sequence having a first frame embedded with a watermark; and
    recovering the watermark within the first frame through analysis of intensity differences between the first frame of the video sequence and a second frame of the video sequence, the recovering of the watermark includes:
    computing a sum for products of (i) differences between watermarked intensities of the first frame and the second frame of the video sequence and (ii) corresponding elements of the pseudo-random number sequence
    computing a product of (i) a mean value for the differences between watermarked intensities of the first frame and the second frame of the video sequence and (ii) a sum of the pseudo-random number sequence.

2. The method of claim 1, wherein the recovering of the watermark further includes:
    subtracting (i) the product of the mean value for the differences between watermarked intensities of the first frame and the second frame of the video sequence and the sum of the pseudo-random number sequence from (ii) the sum of products of the differences between watermarked intensities of the first fame and the second frame of the video sequence and the corresponding elements of the pseudo-random number sequence.

* * * * *

UNITED STATES PATENT AND TRADEMARK OFFICE
CERTIFICATE OF CORRECTION

PATENT NO. : 6,823,455 B1
DATED : November 23, 2004
INVENTOR(S) : Macy et al.

It is certified that error appears in the above-identified patent and that said Letters Patent is hereby corrected as shown below:

Column 1,
Line 64, equation 1, delete "$I_i+W_i=I_i=S_iA_iR_i$" and insert -- $I_i+W_i=I_i+S_iA_iR_i$ --.

Column 4,
Line 62, delete "modern" and insert -- modem --.

Column 10,
Line 36, delete "R" and insert -- $R_i$ --.

Signed and Sealed this

Thirty-first Day of May, 2005

JON W. DUDAS
*Director of the United States Patent and Trademark Office*